(12) United States Patent
Furumura et al.

(10) Patent No.: US 8,318,047 B2
(45) Date of Patent: Nov. 27, 2012

(54) METHOD FOR PROVIDING RF POWDER AND RF POWDER-CONTAINING LIQUID

(75) Inventors: Yuji Furumura, Yokohama (JP); Naomi Mura, Tokyo (JP); Shinji Nishihara, Kokubunji (JP); Katsuhiro Fujino, Yokohama (JP); Katsuhiko Mishima, Yokohama (JP); Susumu Kamihashi, Yokohama (JP)

(73) Assignee: Philtech, Inc., Tokyo (JP)

( * ) Notice: Subject to any disclaimer, the term of this patent is extended or adjusted under 35 U.S.C. 154(b) by 439 days.

(21) Appl. No.: 12/516,705

(22) PCT Filed: Nov. 26, 2007

(86) PCT No.: PCT/JP2007/072749
§ 371 (c)(1), (2), (4) Date: Oct. 20, 2009

(87) PCT Pub. No.: WO2008/065991
PCT Pub. Date: Jun. 5, 2008

(65) Prior Publication Data
US 2010/0072426 A1    Mar. 25, 2010

(30) Foreign Application Priority Data
Nov. 28, 2006    (JP) ................ 2006-320336

(51) Int. Cl.
| H01B 1/00 | (2006.01) |
| H01B 1/12 | (2006.01) |
| B05D 5/12 | (2006.01) |
| B28B 19/00 | (2006.01) |
| B29B 15/10 | (2006.01) |
| C23C 18/00 | (2006.01) |
| C23C 20/00 | (2006.01) |
| C23C 24/00 | (2006.01) |
| C23C 26/00 | (2006.01) |
| C23C 28/00 | (2006.01) |
| C23C 30/00 | (2006.01) |
| H01C 17/06 | (2006.01) |
| H05K 3/00 | (2006.01) |

(52) U.S. Cl. ............ 252/500; 235/492; 257/E21.599; 340/5.1; 340/572.7; 343/700 R; 343/873; 361/270; 427/96.1; 427/180; 438/113

(58) Field of Classification Search ........... 252/500; 235/375, 451, 492; 257/E21.599; 340/5.1, 340/572.7; 343/700 R, 873; 361/270; 427/96.1, 427/180; 438/113
See application file for complete search history.

(56) References Cited

U.S. PATENT DOCUMENTS

| 3,946,206 A | 3/1976 | Darjany |
| 4,058,839 A | 11/1977 | Darjany |
| 4,745,401 A | 5/1988 | Montean |
| 5,204,681 A | 4/1993 | Greene |
| 5,291,205 A | 3/1994 | Greene |
| 5,497,952 A | 3/1996 | Iding |
| 5,518,937 A | 5/1996 | Furumura et al. |
| 5,581,257 A | 12/1996 | Greene et al. |
| 5,808,587 A | 9/1998 | Shima |
| 6,072,394 A | 6/2000 | Hasegawa et al. |
| 6,285,284 B1 | 9/2001 | Soe et al. |
| 6,479,384 B2 | 11/2002 | Komai et al. |
| 6,642,827 B1 | 11/2003 | McWilliams et al. |
| 6,758,397 B2 | 7/2004 | Catan |
| 6,966,488 B2 | 11/2005 | Yamagami |
| 7,061,083 B1 | 6/2006 | Usami et al. |
| 7,158,033 B2 | 1/2007 | Forster |
| 7,227,504 B2 | 6/2007 | Deguchi et al. |
| 7,288,320 B2 | 10/2007 | Steenblik et al. |
| 7,317,420 B2 | 1/2008 | Aisenbrey |
| 7,405,665 B2 | 7/2008 | Yamazaki |
| 7,427,577 B2 | 9/2008 | Tang et al. |
| 7,508,305 B2 | 3/2009 | Yamazaki et al. |
| 7,623,036 B2 | 11/2009 | Onderko et al. |
| 7,876,189 B2 | 1/2011 | Gilmartin et al. |
| 7,893,837 B2 | 2/2011 | Yamazaki et al. |
| 7,984,849 B2 | 7/2011 | Berghel et al. |
| 2003/0037240 A1 | 2/2003 | Yamagishi et al. |

(Continued)

FOREIGN PATENT DOCUMENTS

JP    61-006783    1/1986

(Continued)

OTHER PUBLICATIONS

Hitachi Pamphlet, World's smallest and thinnest 0.15 × 0.15 mm, 7.5 μm thick RFID IC chip, Feb. 6, 2006, http://www.hitachi.com/New/cnews/060206.html.*

Naomi Mura, Yuji Furumura, Katsuhiro Fujino, Shinji Nishihara, Susumu Kamihashi and Katsuhiko Mishima,RF-Powder : Fabrication of 0.15-mm Si-powder Resonating at Microwave Frequencies,Proceedings of the 37th European Microwave Conference, 392-395, Oct. 2007.*

Non-Final Office Action for U.S. Appl. No. 12/516,500, mailed on Sep. 29, 2011, 15 pp.

Non-Final Office Action for U.S. Appl. No. 12/521,244, mailed on Nov. 8, 2011, 11 pp.

(Continued)

Primary Examiner — Bijan Ahvazi
(74) Attorney, Agent, or Firm — Foley & Lardner LLP (57) ABSTRACT

Provided are a method for providing an RF powder that is easily handled because it is used as a powder (powdery state), not used as individual elements, and is high in applicability and extensibility, extremely low in manufacturing cost in respect of the unit price of each particle, and extremely high in practicability; and an RF powder-containing liquid. In the method for providing an RF powder, an RF powder composed of a large number of RF powder particles 11a is provided to a user in a state of being stored in a container 1. The RF powder is stored in the container 1 together with a medium that prevents the large number of RF powder particles 11a from adhering to one another. The medium is a liquid having a specific color determined so as to correspond to the characteristic frequency of the RF powder.

17 Claims, 10 Drawing Sheets

U.S. PATENT DOCUMENTS

| | | | |
|---|---|---|---|
| 2003/0095032 A1 | 5/2003 | Hoshino et al. | |
| 2003/0136828 A1 | 7/2003 | Takesada et al. | |
| 2005/0194591 A1 | 9/2005 | Usami et al. | |
| 2006/0044111 A1 | 3/2006 | Kollar et al. | |
| 2006/0044769 A1 | 3/2006 | Forster et al. | |
| 2006/0202269 A1 | 9/2006 | Suzuki et al. | |
| 2007/0138251 A1* | 6/2007 | Mattlin et al. | 235/375 |
| 2007/0176622 A1 | 8/2007 | Yamazaki | |
| 2007/0210364 A1 | 9/2007 | Kato et al. | |
| 2008/0042168 A1 | 2/2008 | Watanabe et al. | |
| 2008/0130018 A1 | 6/2008 | Steenblik et al. | |
| 2008/0303735 A1 | 12/2008 | Fujimoto et al. | |
| 2009/0206151 A1 | 8/2009 | Morita | |
| 2010/0026441 A1 | 2/2010 | Wedley | |
| 2010/0066619 A1 | 3/2010 | Furumura et al. | |
| 2010/0067166 A1 | 3/2010 | Furumura et al. | |
| 2011/0063184 A1 | 3/2011 | Furumura et al. | |

FOREIGN PATENT DOCUMENTS

| | | |
|---|---|---|
| JP | 63-112198 | 5/1988 |
| JP | 63-261851 | 10/1988 |
| JP | 03-087027 | 4/1991 |
| JP | 05-101249 | 4/1993 |
| JP | 06-350495 | 12/1994 |
| JP | 07-263935 | 10/1995 |
| JP | 08-022514 | 1/1996 |
| JP | 08-305970 | 11/1996 |
| JP | 10-069533 | 3/1998 |
| JP | 10-171951 | 6/1998 |
| JP | 11-328493 | 11/1999 |
| JP | 2000-269166 | 9/2000 |
| JP | 2001-230220 | 8/2001 |
| JP | 2002-271122 | 9/2002 |
| JP | 2002-333913 | 11/2002 |
| JP | 2003-058659 | 2/2003 |
| JP | 2003-087044 | 3/2003 |
| JP | 2003-157477 | 5/2003 |
| JP | 2003-179005 | 6/2003 |
| JP | 2003-187195 | 7/2003 |
| JP | 2003-216908 | 7/2003 |
| JP | 2003-242472 | 8/2003 |
| JP | 2004-079746 | 3/2004 |
| JP | 2004-139405 | 5/2004 |
| JP | 2004-159960 | 6/2004 |
| JP | 2005-020058 | 1/2005 |
| JP | 2005-050997 | 2/2005 |
| JP | 2005-183741 | 7/2005 |
| JP | 2005-197630 | 7/2005 |
| JP | 2005-208775 | 8/2005 |
| JP | 2005-216099 | 8/2005 |
| JP | 2005-284333 | 10/2005 |
| JP | 2005-285109 | 10/2005 |
| JP | 2005-340658 | 12/2005 |
| JP | 2005-340791 | 12/2005 |
| JP | 2006-012086 | 1/2006 |
| JP | 2006-027745 | 2/2006 |
| JP | 2006-041986 | 2/2006 |
| JP | 2006-066899 | 3/2006 |
| JP | 2006-180043 | 7/2006 |
| JP | 2006-203852 | 8/2006 |
| JP | 2006-277667 | 10/2006 |
| JP | 2006-285958 | 10/2006 |
| WO | WO 00/36555 | 6/2000 |
| WO | WO-2008/099955 | 8/2008 |

OTHER PUBLICATIONS

Notice of Allowance for U.S. Appl. No. 12/516,493, mailed on Oct. 17, 2011, 14 pp.

Non-Final Office Action for U.S. Appl. No. 12/516,497, mailed on Nov. 21, 2011, 10 pp.

"RFID 'Powder'—World's Smallest RFID Tag," Hitachi, Technovelgy LLC, Feb. 14, 2007, http://www.technovelgy.com/ct/Science-Fiction-News.asp?NewsNum=939, 3 pp.

International Preliminary Report on Patentability for PCT/JP2007/072747, mailed Jun. 11, 2009 (English Translation).

International Preliminary Report on Patentability for PCT/JP2007/072748, mailed Jun. 11, 2009 (English Translation).

International Search Report and Written Opinion for PCT/JP2007/072747, mailed Jan. 29, 2008 (English Translation).

International Search Report and Written Opinion for PCT/JP2007/072748, mailed Feb. 19, 2008 (English Translation).

International Search Report and Written Opinion for PCT/JP2007/072749 mailed Feb. 19, 2008 (English Translation).

International Search Report and Written Opinion for PCT/JP2007/072750, mailed Feb. 26, 2008 (English Translation).

International Search Report and Written Opinion for PCT/JP2007/072751, mailed Feb. 5, 2008 (English Translation).

International Search Report and Written Opinion for PCT/JP2007/072752, mailed Feb. 12, 2008 (English Translation).

Junko Yoshida, "Euro bank notes to embed RFID chips by 2005," EETimes News and Analysis, Dec. 19, 2001, http://www.eetimes.com/story/OEG20011219S0016, 3 pp.

Li Yang et al., "Design and Development of Novel Miniaturized UHF RFID Tags on Ultra-low-cost Paper-based Substrates," Proceedings of Asia-Pacific Microwave Conference 2006, vol. 12, Issue 15, Dec. 2006, pp. 1493-1496.

N Mura et al., "RF-Powder : Fabrication of 0.15-mm Si-powder Resonating at Microwave Frequencies," IEEE European Microwave Conference, 2007, vol. 9 , Issue 12, Oct. 2007, pp. 392-395.

Non-Final Office Action for U.S. Appl. No. 12/516,643, mailed on Jan. 12, 2012.

Notice of Allowance for U.S. Appl. No. 12/516,493, mailed on Jan. 20, 2012.

Notice of Allowance for U.S. Appl. No. 12/521,244, mailed on Jan. 26, 2012.

Tetsuo Nozawa, "Hitachi Achieves 0.05-mm Square Super Micro RFID Tag, 'Further Size Reductions in Mind'," Tech-On Nikkei Business Publications, Feb. 20, 2007, http://techon.nikkeibp.com.jp/english/NEWS_EN/20070220/127959/, 2 pp.

Tim Hornyak, "RFID Powder," Scientific American, Inc., Feb. 2008, pp. 68-71.

W Choi et al., "RFID Tag Antenna with a Meandered Dipole and Inductively Coupled Feed," IEEE Antennas and Propagation Society International Symposium 2006, vol. 9, Issue 14, Jul. 2006, pp. 619-622.

Winston Chai, "Euro notes to get RFID tags from Hitachi?," CBS Interactive Limited, May 23, 2003, http://networks.silicon.com/mobile/0,39024665,10004316,00.htm, 8 pp.

International Preliminary Report on Patentability issued Jun. 3, 2009 for PCT/JP2007/072751 (English Translation).

International Preliminary Report on Patentability issued Jun. 3, 2009 for PCT/JP2007/072752 (English translation).

International Preliminary Report on Patentability issued Jun. 3, 2009 for PCT/JP2007/072746 (English Translation).

International Search Report mailed Feb. 19, 2008 for PCT/JP2007/072746 (English translation).

International Preliminary Report on Patentability issued Jul. 9, 2009 for PCT/JP2007/074108 (English translation).

Usami, Mitsuo, An ultrasmall RFID chip:m-chip, Oyo Buturi, vol. 73, No. 9, pp. 1179-1183 (2004).

Usami, Mitsuo, et al., Ubiquitous Technology IC Tag, first edition, Ohmsha, Ltd., pp. 115, Mar. 15, 2005.

International Preliminary Report on Patentability for PCT/JP2007/072749 mailed Jun. 11, 2009.

Final Office Action issued for U.S. Appl. No. 12/516,497, mailed on Jun. 5, 2012.

Non-Final Office Action issued for U.S. Appl. No. 12/516,500, mailed on Jun. 14, 2012.

Non-final Office Action for U.S. Appl. No. 12/516,500 dated Feb. 3, 2012.

Notice of Allowance for U.S. Appl. No. 12/516,493 dated Feb. 23, 2012.

Notice of Allowance for U.S. Appl. No. 12/521,244, mailed on Mar. 29, 2012.

Final Office Action issued for U.S. Appl. No. 12/516,643, mailed on Aug. 17, 2012, 14 pp.

* cited by examiner

METHOD FOR PROVIDING RF POWDER AND RF POWDER-CONTAINING LIQUID

CROSS-REFERENCE TO RELATED APPLICATIONS

The present application is a U.S. national stage application claiming the benefit of International Application No. PCT/JP2007/072749, filed on Nov. 26, 2007, which claims the benefit of Japanese Application No. 2006-320336, filed on Nov. 28, 2006, the entire contents of which are incorporated herein by reference in their entireties.

TECHNICAL FIELD

The present invention relates to a method for providing an RF powder and a RF powder-containing liquid, and more specifically relates to a method for providing an RF powder that can adhere to a surface of, for example, paper or can be contained in, for example, paper and can allow reading out information therein with a high-frequency electromagnetic field (radio) given from outside, and relates to a liquid containing such an RF powder.

BACKGROUND ART

Currently, it is believed that IC tags are products in the entrance to ubiquitous era. The IC tags have been developed as RF-IDs (ultra-compact radio frequency identifications) in, for example, name tags, Suica cards, and FeRAM cards. Many people expect that the IC tag market will certainly grow in the future. However, the market has not been expanded as expected. This is caused by problems that should be socially solved, such as cost, security, and confidentiality.

The price of the IC tag can be decreased by reducing the size of its IC tag chip. This is because that a reduction in size of the IC tag chip allows producing a large number of IC tag chips from one wafer. An IC tag chip with a size of 0.4 mm square has been developed at the present time. This IC tag chip allows reading out 128-bit memory data in the chip with a microwave of 2.45 GHz (for example, see Non-Patent Document 1).

Conventionally, the IC tag chip is bonded on a sheet base, such as a film, one by one with an adhesive (for example, see Patent Document 1).

[Patent Document 1] Japanese Unexamined Patent Application Publication No. 2005-284333
[Non-Patent Document 1] Mitsuo USAMI, (An ultra small radio IC tag chip: μ-chip)", OYO BUTURI (Applied Physics), Vol. 73, No. 9, 2004, pp. 1179-1183.

DISCLOSURE OF INVENTION

Problems to be Solved by the Invention

The IC tag chip disclosed in Non-Patent Document 1 is a semiconductor element that, fundamentally, is discretely handled. However, since a typical IC tag chip is an ultra-small semiconductor element having a size of about 0.4 mm, it is difficult to actually handle each IC tag chip discretely. In addition, its cost is expensive.

Conventionally, the IC tag chips are used by bonding one by one on a sheet base such as a film. In this process, a reduction in size of the IC tag chips makes it difficult to singly handle each IC tag chip for inspection of quality or mounting.

Accordingly, in a novel RF powder composed of particle elements (RF powder particles) that are finer than the IC tag chip, the method for providing the RF powder is important from the viewpoint of increasing the easiness of handling the RF powder. Furthermore, such a method should be that of enhancing convenience, applicability, and extensibility of the RF powder.

The "RF powder" means a large amount of particles (RF powder particles) that form a powder (powdery substance or granular substance) and each include an electric circuit element conducting with an external reader for transmission and reception of a signal via radio (high-frequency electromagnetic field) and that are usually used in a powdery state, which is a collective state.

Accordingly, from the view of the above-mentioned problems, it is an object of the present invention to provide a method for providing an RF powder and RF powder-containing liquid. RF powder is composed of a large amount of particles and has properties allowing to be used as a powder (powdery substance) forming a collective state. The large amount of particles forming a powder each have a smaller size than those of known IC tag chips, are used in a powdery state not as discrete elements, are easy in handling, have high applicability and extensibility, are significantly low in manufacturing cost per particle, and have high practicability.

Means for Solving the Problems

The method for providing an RF powder and an RF powder-containing liquid according to the present invention are configured as below for achieving the above objects.

In the method for providing an RF powder according to the present invention, an RF powder composed of a large number of RF powder particles stored in a container is provided to a user of the RF powder. The RF powder composed of a large number of RF powder particles is stored in the container together with a medium that prevents the particles from adhering to one another.

In the above method, the medium is preferably a liquid. Furthermore, this liquid preferably has a specific color. The specific color of the liquid is determined so as to correspond to the characteristic frequency of the RF powder.

The RF powder-containing liquid according to the present invention is a liquid containing an RF powder composed of a large number of RF powder particles each including a substrate and an antenna circuit element disposed on an insulating surface of the substrate.

In the above configuration, the antenna circuit element is a resonant circuit that responds to an electromagnetic field from outside.

In the above configuration, the liquid preferably has a specific color. The specific color of the liquid is determined so as to correspond to the characteristic frequency of the RF powder.

The RF powder is stored and managed in a state being contained in a liquid in a container. Furthermore, the size of a rectangular plane having a maximum long side of the RF powder particle, is preferably 0.30 mm square or less and more preferably 0.15 mm square or less.

The liquid containing the RF powder is characterized by containing a pigment and a fixative.

Advantages

The present invention achieves the following advantageous effects.

First, the RF powder particles are essentially used as a powder, not being singly used as in, for example, IC tag chips, and are handled as an RF powder-containing liquid stored together with a liquid medium in a container. Therefore, the RF powder particles are prevented from adhering to one another and are allowed to be readily handled. Furthermore, since the RF powder particles are contained in a liquid that is stored in a container and has a desired color according to the characteristic frequency of the RF powder particles, the RF powder particles are further simplified in handling and also are enhanced in applicability and extensibility.

Second, since the RF powder-containing liquid contains a fixative, the RF powder particles can be reliably fixed to, for example, paper by applying the RF powder-containing liquid to the paper.

BEST MODES FOR CARRYING OUT THE INVENTION

Preferable embodiments (examples) of the present invention will now be described with reference to the accompanying drawings.

Embodiments of the RF powder-containing liquid according to the present invention will be described with reference to FIGS. 1 to 7.

Figure 1:
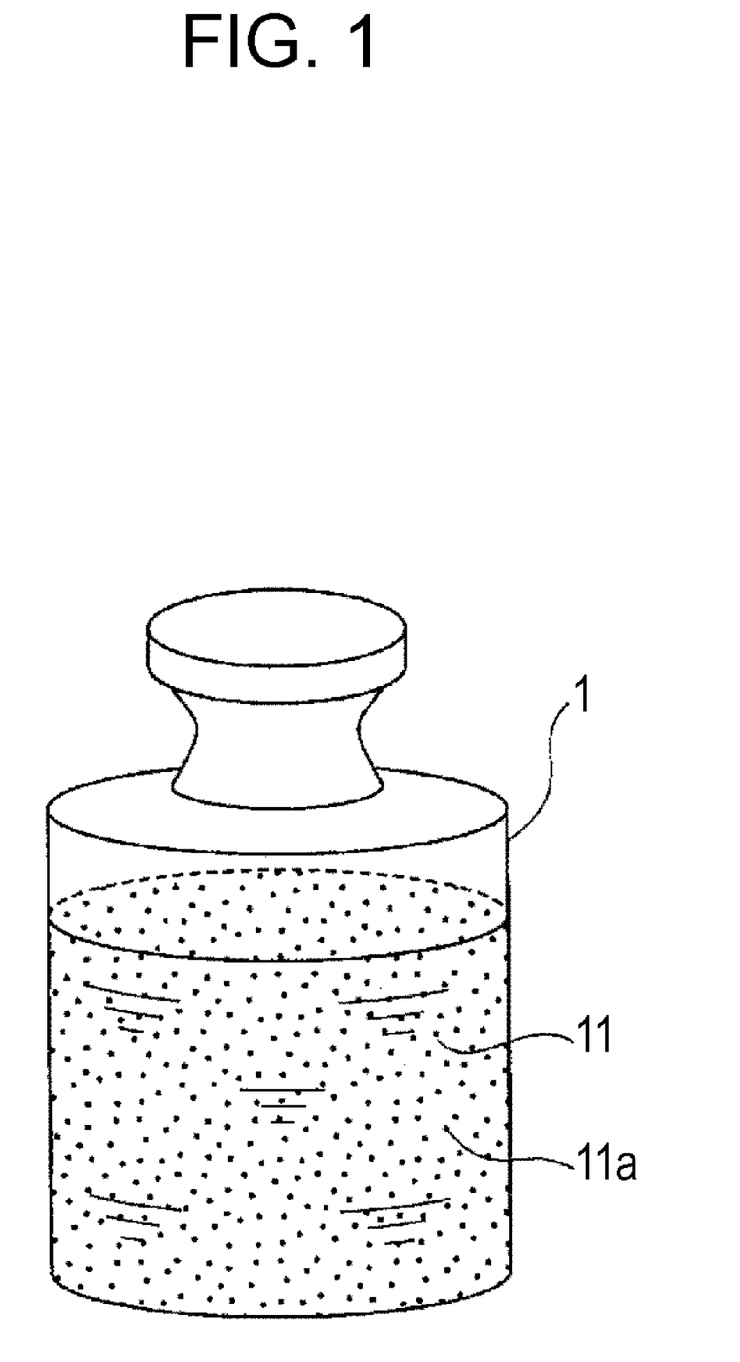
FIG. 1 is a diagram showing a form of use and management of an RF powder-containing liquid according to an embodiment of the present invention.

FIG. 1 shows an embodiment of application and storage/management of the RF powder-containing liquid. FIG. 1 shows an appearance of the RF powder-containing liquid 11 stored in a container 1 such as a bottle. A large number of black spots 11a shown in the RF powder-containing liquid 11 in the container 1 are an image of the RF powder particles being uniformly distributed in the RF powder-containing liquid 11 at a predetermined density.

The RF powder-containing liquid 11 is composed of a liquid as a medium, a large amount (number) of RF powder particles 11a, a pigment for adding a specific color to the liquid, and a fixative for fixing the pigment and the RF powder particles 11a to, for example, paper. The liquid as the medium is, for example, water, alcohol, or ink. The liquid herein contains a large amount of the RF powder particles 11a to form an RF powder-containing liquid 11. The large amount of the RF powder particles 11a forms an RF powder (powdery substance or granular substance) when it is not present in a liquid medium. The large amount of the RF powder particles 11a are prevented from adhering to one another by being contained in the liquid medium. Thus, the RF powder particles 11a are provided to a user as an RF powder-containing liquid 11 stored in a container 1.

Since the liquid medium described above contains a pigment, the RF powder-containing liquid 11 is previously colored to a specific color depending on the pigment. The pigment is used such that the color is different in each characteristic frequency. Accordingly, the RF powder-containing liquid 11 is colored according to the characteristic frequency of the RF powder particles 11a contained in the liquid. The term "characteristic frequency of the RF powder particle 11a" herein means the resonant frequency of antenna circuit element in the RF powder particle 11a that responds to a high-frequency electromagnetic field given from outside.

Figure 2:
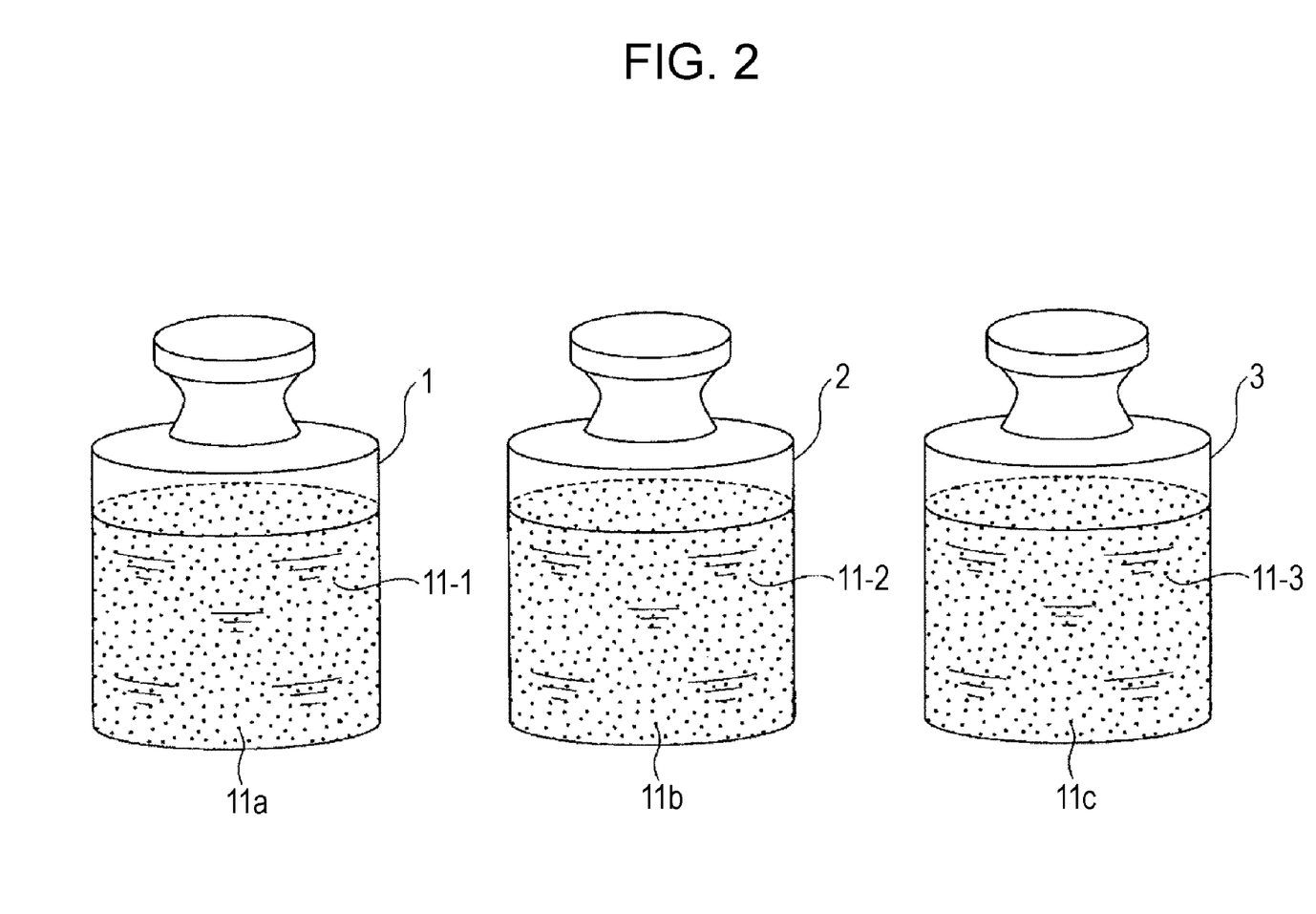
FIG. 2 is diagrams showing a form of use and management of three different RF powder-containing liquids according to an embodiment of the present invention.

FIG. 2 shows an example of the relation between the characteristic frequencies of RF powder particles 11a and the specific colors added to RF powder-containing liquids 11. In FIG. 2, a container 1 contains an RF powder-containing liquid 11-1 that contains a large amount of RF powder particles 11a having a characteristic frequency of 2.45 GHz and a blue pigment to color the liquid to blue; a container 2 contains an RF powder-containing liquid 11-2 that contains RF powder particles 11a having a characteristic frequency of 2.0 GHz and a yellow pigment to color the liquid to yellow; and a container 3 contains an RF powder-containing liquid 11-3 that contains RF powder particles 11a having a characteristic frequency of 1.5 GHz and a red pigment to color the liquid to red. Therefore, the characteristic frequency of the RF powder particles 11a contained in each of the RF powder-containing liquids 11-1, 11-2, and 11-3 can be distinguished from the color of the liquid. Accordingly, the RF powder particles can be readily managed and used, which enhances convenient for users. Furthermore, the color of an RF powder-containing liquid can be mixed by suitably selecting and mixing RF powder-containing liquids having different colors. Therefore, it is obvious that a liquid contains different RF powder particles having different characteristic frequencies by just looking at the color of the liquid mixture, which is significantly convenient for users.

Figure 3:
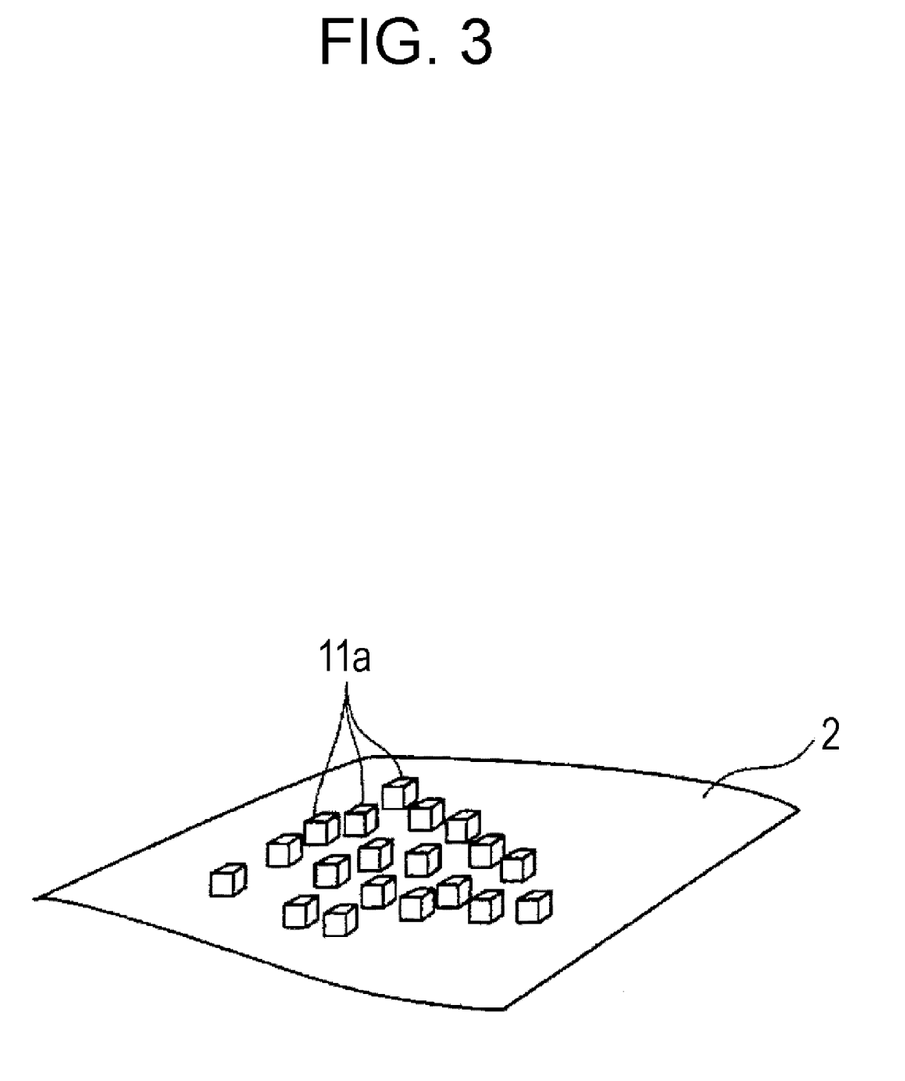
FIG. 3 is an external perspective view of a part of RF powder particles contained in the RF powder-containing liquid according to the embodiment.

FIG. 3 is an enlarged view of RF powder particles 11a that remain on a sheet member 2 when an RF powder-containing liquid 11 in a container 1 is dropwise applied to the sheet member 2 and the liquid component is removed by evaporation. In FIG. 3, the RF powder particles 11a are shown in enlarged size, but the thickness of the sheet member 2 is not enlarged.

In the state shown in FIG. 3, since the RF powder-containing liquid 11 contains a fixative, as described above, the RF powder particles 11a are reliably fixed to the sheet member 2 such as paper by applying the RF powder-containing liquid 11 to the paper.

The liquid medium used in the RF powder-containing liquid 11 preferably has properties generating adhesiveness and being converted to a solid state by drying or to a gas state by evaporation.

The configuration of each of the plurality of RF powder particles 11a will be specifically described with reference to FIGS. 4 to 6.

Figure 4:
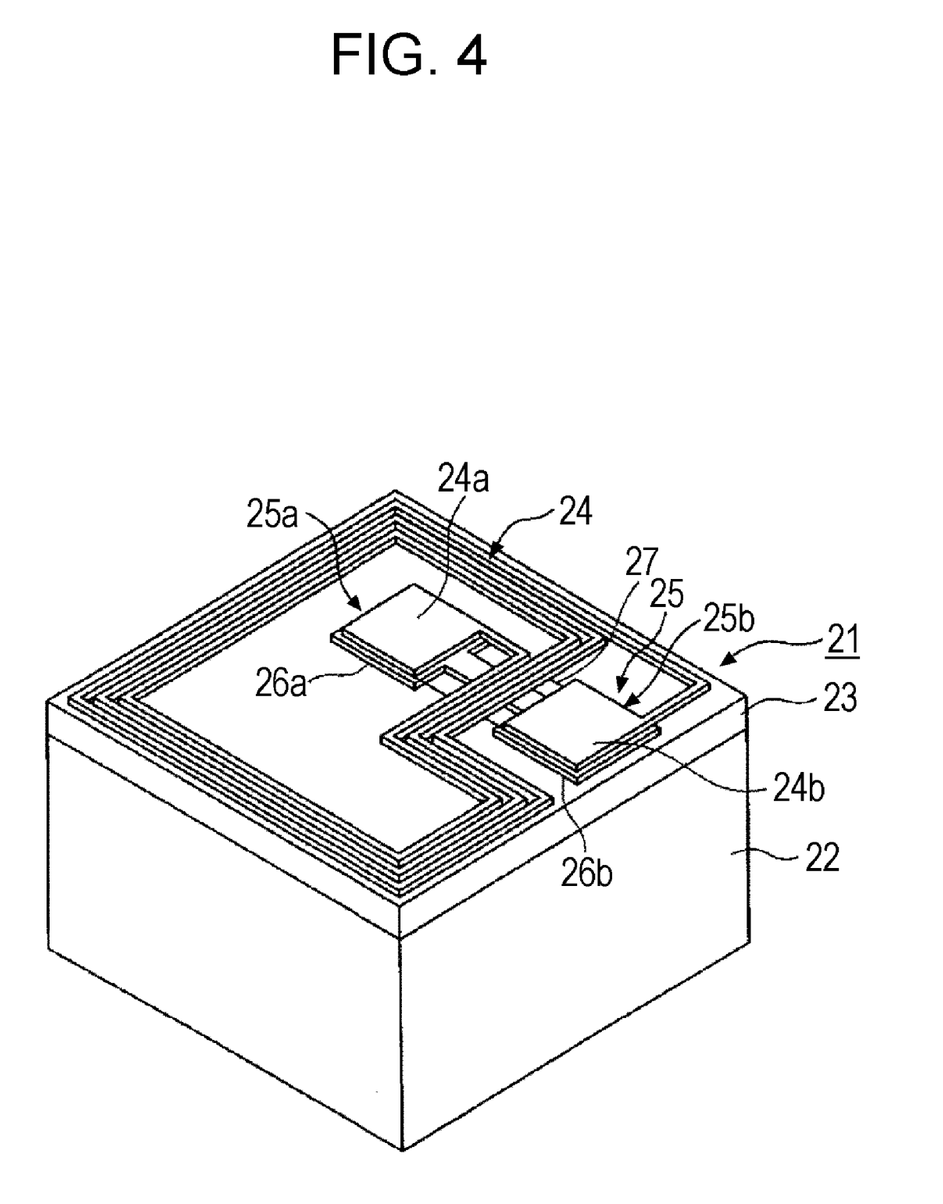
FIG. 4 is a perspective view of an RF powder particle contained in the RF powder-containing liquid according to the embodiment.
Figure 5:
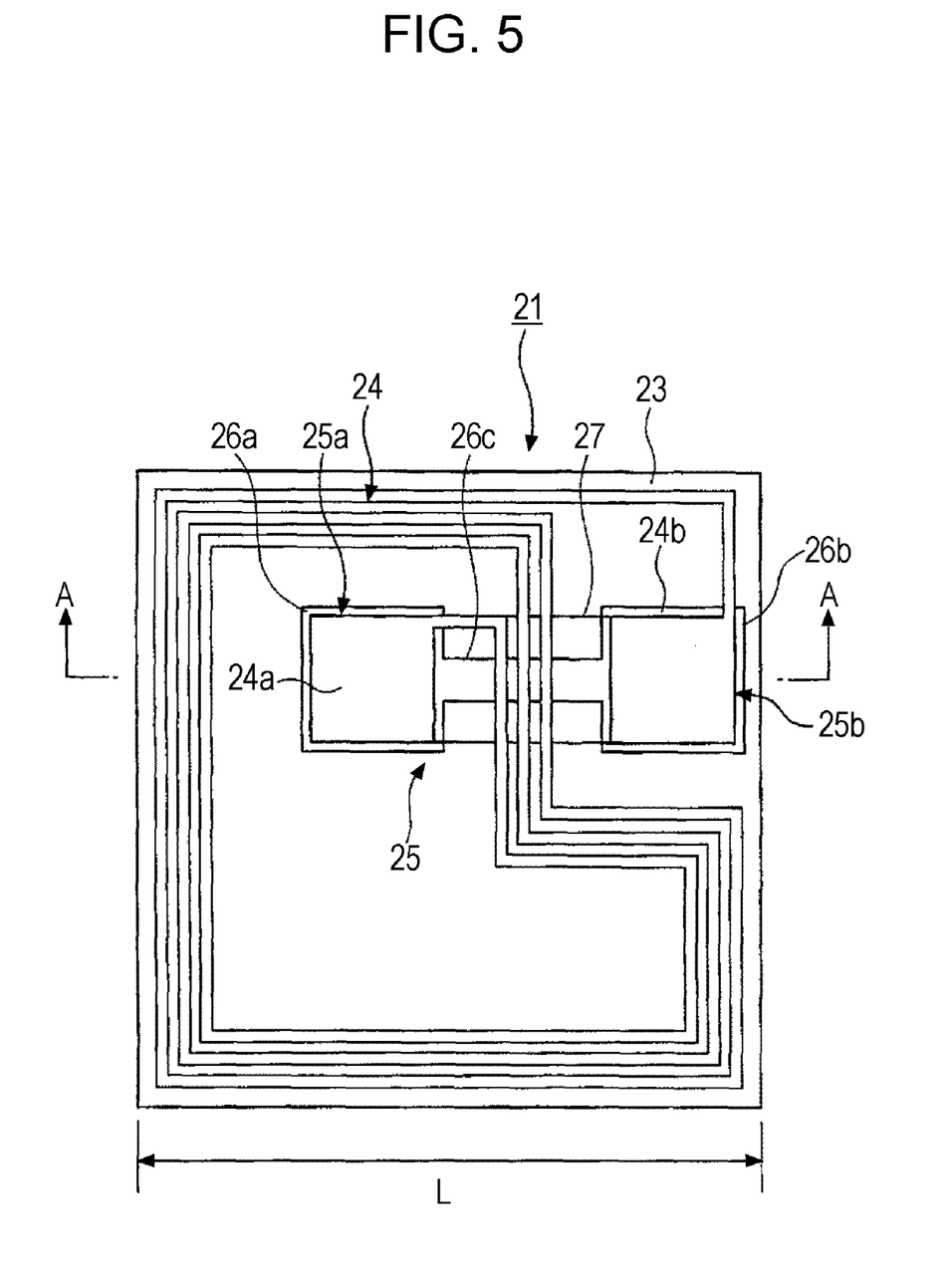
FIG. 5 is a plan view of an RF powder particle contained in the RF powder-containing liquid according to the embodiment.
Figure 6:
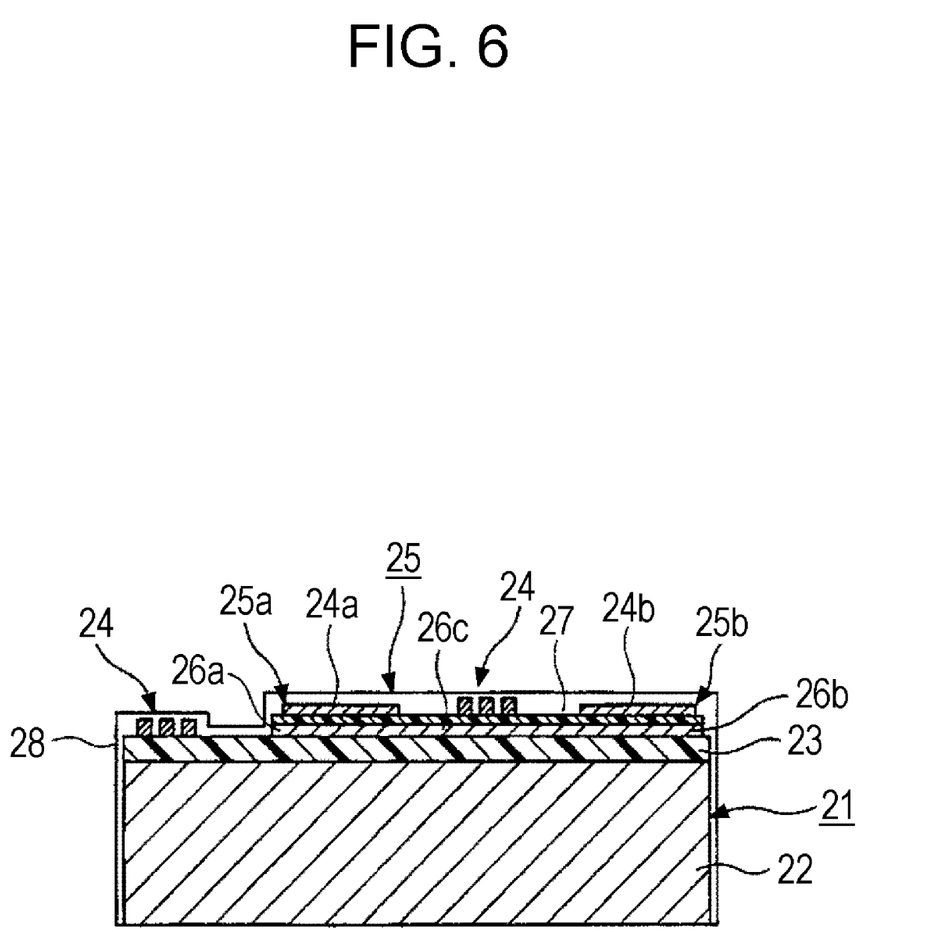
FIG. 6 is a cross-sectional view taken along the A-A line of FIG. 5.

FIG. 4 is an external perspective view of an RF powder particle, FIG. 5 is a plan view of the RF powder particle, and FIG. 6 is a cross-sectional view taken along the A-A line of FIG. 5. The longitudinal cross-sectional view of FIG. 6 shows the thickness of the RF powder particle in enlarged scale.

The RF powder particle 21 preferably has a cubic or plate-like rectangular parallelepiped three-dimensional shape where the rectangular plane surface having a maximum side, in the plurality of external rectangular plane surfaces, is preferably 0.30 mm square or less and more preferably 0.15 mm square or less. As shown in FIG. 5, the RF powder particle 21 in this embodiment has a square planar surface. In the RF powder particle 21 in FIG. 5, for example, one side of the square planar surface i.e. L has a length of a 0.15 mm (150 μm).

In the RF powder particle 21, an insulating layer 23 (for example, $SiO_2$) is formed on a substrate 22 made of, for example, silicon (Si), and a multi-wound coil 24 (inductance element) and a condenser (or capacitor) 25 (capacitance elements) are formed on the insulating layer 23 by a film-forming technique. The thickness of the insulating layer 23 is, for example, about 10 μm. The condenser 25 includes two elements 25a and 25b.

The coil 24 and the condenser 25 disposed on the insulating layer 23 have a function of magnetic coupling that responds to a high-frequency electromagnetic field having a specific frequency (for example, 2.45 GHz). As shown in FIG. 4 or 5, the coil 24 is formed by, for example, coiling a conductive wiring line three times along each side of a square planar surface of the RF powder particle 21. The material of the conductive wiring line forming the coil 24 is, for example, copper (Cu). The both ends of the coil 24 are formed into square pads 24a and 24b each having a desired area. One of the two pads 24a and 24b is disposed at the inner circumference of the coil 24, and the other is disposed at the outer circumference of the coil 24. The two pads 24a and 24b are disposed such that the line connecting the both is orthogonal to the coil 24 crossing between the pads. The pads 24a and 24b function as upper electrodes of the two elements 25a and 25b of the condenser 25, respectively.

In the above, the number of the winding turns of the coil 24 may be properly designed. In addition, the shape of the coil 24 may be properly designed.

The condenser 25 in this embodiment includes, for example, two condenser elements 25a and 25b. The condenser element 25a includes an upper electrode 24a, a lower electrode 26a (for example, aluminum (Al)), and an insulating film 27 (for example, $SiO_2$) disposed therebetween. The lower electrode 26a and the upper electrode 24a have approximately the same electrode shapes and are electrically insulated from each other with the insulating film 27. The condenser element 25b includes an upper electrode 24b, a lower electrode 26b, and an insulating film 27 disposed therebetween. Similar to the above, the lower electrode 26b and the upper electrode 24b have approximately the same electrode shapes and are electrically insulated from each other with the insulating film 27.

The lower electrode 26a of the condenser element 25a and the lower electrode 26b of the condenser element 25b are connected to each other with a conductive wiring line 26c. Practically, the lower electrodes 26a and 26b and the conductive wiring line 26c are integrally formed. A single insulating film serves as both the insulating film 27 of the condenser element 25a and the insulating film 27 of the condenser 25b. The insulating film 27 has a thickness of, for example, 30 nm and electrically insulates the conductive wiring line 26c connecting the lower electrodes 26a and 26b from the coil 24 in the region between the two condenser elements 25a and 25b.

In the above configuration, the condenser 25 composed of the two condenser elements 25a and 25b that are electrically connected in series is connected to the both ends of the coil 24. The coil 24 and the condenser 25 connected so as to form a loop form a tank circuit (LC resonant circuit). The tank circuit responds to a high-frequency electromagnetic field having a frequency that is identical to the resonant frequency.

As obvious from FIG. 6, the entire surface of the RF powder particle 21 is coated with a P-SiN film 28. The P-SiN film 28 protects the entire surface, where the tank circuit is formed, of the RF powder particle 21.

In the above, the condenser 25 includes the two condenser elements 25a and 25b, but is not limited thereto and may be formed of any one of the condenser elements. The capacitance value of the condenser 25 can be properly changed by controlling the area of the electrode. Furthermore, a plurality of condensers may be disposed in parallel.

Since the RF powder particle 21 having the above-mentioned configuration includes a tank circuit composed of the coil 24 and the condenser 25 that are connected to each other so as to form a loop on the insulating surface of the substrate 22, the RF powder particle 21 has a function of resonating (this is expressed as responding) by coupling with a magnetic field having a high-frequency that is defined by the unique resonant frequency of the tank circuit. Accordingly, the RF powder particle 21 functions as an "RF powder particle" having a property to resonate with a high-frequency magnetic field having a designed unique frequency.

The coil 24 and the condenser 25 disposed on the insulating layer 23 are not electrically connected to the surface of the substrate 22. That is, the insulating layer 23 deposited on the substrate 22 is not provided with contact holes, and thereby contact wiring is not formed. The tank circuit composed of the coil 24 and the condenser 25 is electrically insulated from the silicon substrate 22 and is configured to form a resonant circuit only by itself in a state separated from the substrate 22.

In the RF powder particle 21, the substrate 22 serving as a foundation is a silicon substrate and has an insulating layer 23 on a surface. The substrate may be made of a dielectric (insulator) such as glass, a resin, or plastic, instead of the silicon substrate. When a substrate made of an insulator (dielectric), such as a glass substrate, is used, the insulating layer 23 is not necessary.

The shape and configuration of the RF powder particle 21 are not limited to those shown in FIG. 4 and may be properly modified.

An actual application example of the RF powder-containing liquid 11 will be described with reference to FIGS. 7 and 8.

For example, a user can know the characteristic frequency (2.45 GHz) of the RF powder particles 11a from the color of the RF powder-containing liquid 11 stored in a container 1, and take a required amount of the RF powder-containing liquid from container 1. And a considerable number of RF powder particles 11a having a necessary characteristic frequency can be impregnated into a sheet member 30, such as paper. FIG. 7 shows the thickness of the sheet member 30 in enlarged scale.

The RF powder-containing liquid 11 is attached to a surface of the sheet member 30 such as a bank note. The RF powder-containing liquid 11 can be attached to the surface of the sheet member 30 by a printing technique.

On this occasion, the RF powder particles 11a are used without each RF powder particle being individually inspected. That is, each RF powder particle 11a is not particularly inspected whether the individual RF powder particle 11a is normal or not. FIG. 7 shows a state of a plurality of RF powder particles 11a that are arranged or arrayed on the surface of a sheet member 30 by fixing them with a fixing agent (fixative) 36 having a color. The RF powder particles 11a may be mixed to an object such as paper when the paper is manufactured. In such a case, since a pigment is also contained, the paper is also colored with a color corresponding to the pigment. Accordingly, the characteristic frequency (2.45 GHz) of the RF powder particles 11a contained in the sheet member can be readily distinguished with the color.

When, for example, paper is impregnated with RF powders by applying a plurality of RF powder-containing liquids having different colors to the paper, the color of the paper becomes a mixture of the different colors. Accordingly, the types and concentration ratio of the different RF powder particles (having different frequencies) can be roughly determined from the resulting color. For example, an RF powder-containing liquid having an orange color is obtained by mixing the yellow RF powder-containing liquid 11-2 and the red RF powder-containing liquid 11-3 shown in FIG. 2, and this orange color tells that RF powder particles 11b of 2.0 GHz and RF powder particles 11c of 1.5 GHz are mixed. When paper is colored to orange close to yellow, a user can suppose that the amount of the RF powder particle 11b of 2.0 GHz is large and the amount of the RF powder particle 11c of 1.5 GHz is small. When paper is colored to orange close to red, a user can suppose that the amount of the RF powder particle 11c of 1.5 GHz is large and the amount of the RF powder particle 11b of 2.0 GHz is small.

Figure 7:
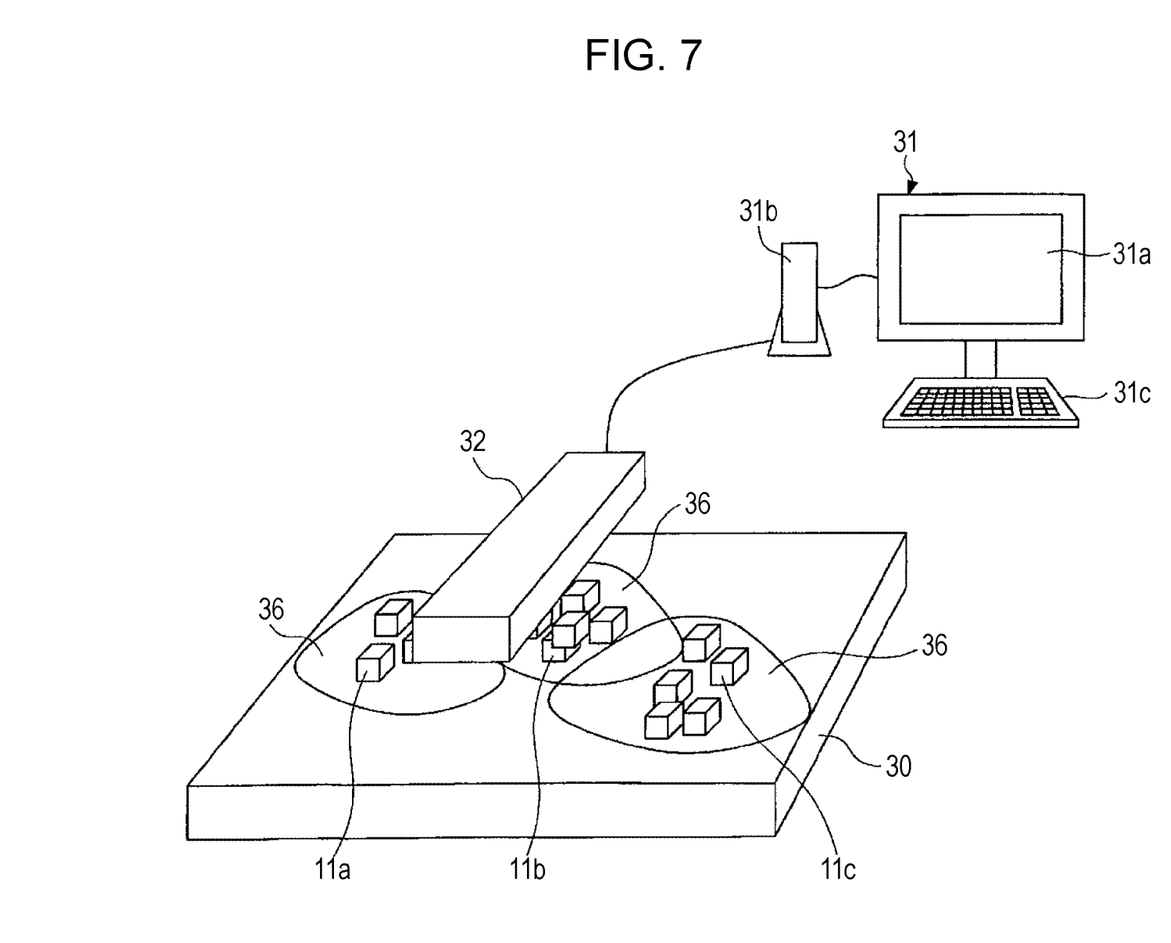
FIG. 7 is an apparatus configuration view illustrating an application example actually used in the RF powder-containing liquid according to the embodiment.

The RF powder particles 11b and 11c shown in FIG. 7 have the same configuration as that of the powder particle 11a except that their tank circuits respond to 2.0 GHz and 1.5 GHz, respectively.

A reader 32 connected to a computer 31 scans the sheet member 30 having a plurality of RF powder particles 11a to 11c and reads the frequency response information of the plurality of RF powder particles 11a to 11c. The computer 31 includes a display 31a, a body 31b processing data, a keyboard 31c, and other components.

Figure 8:
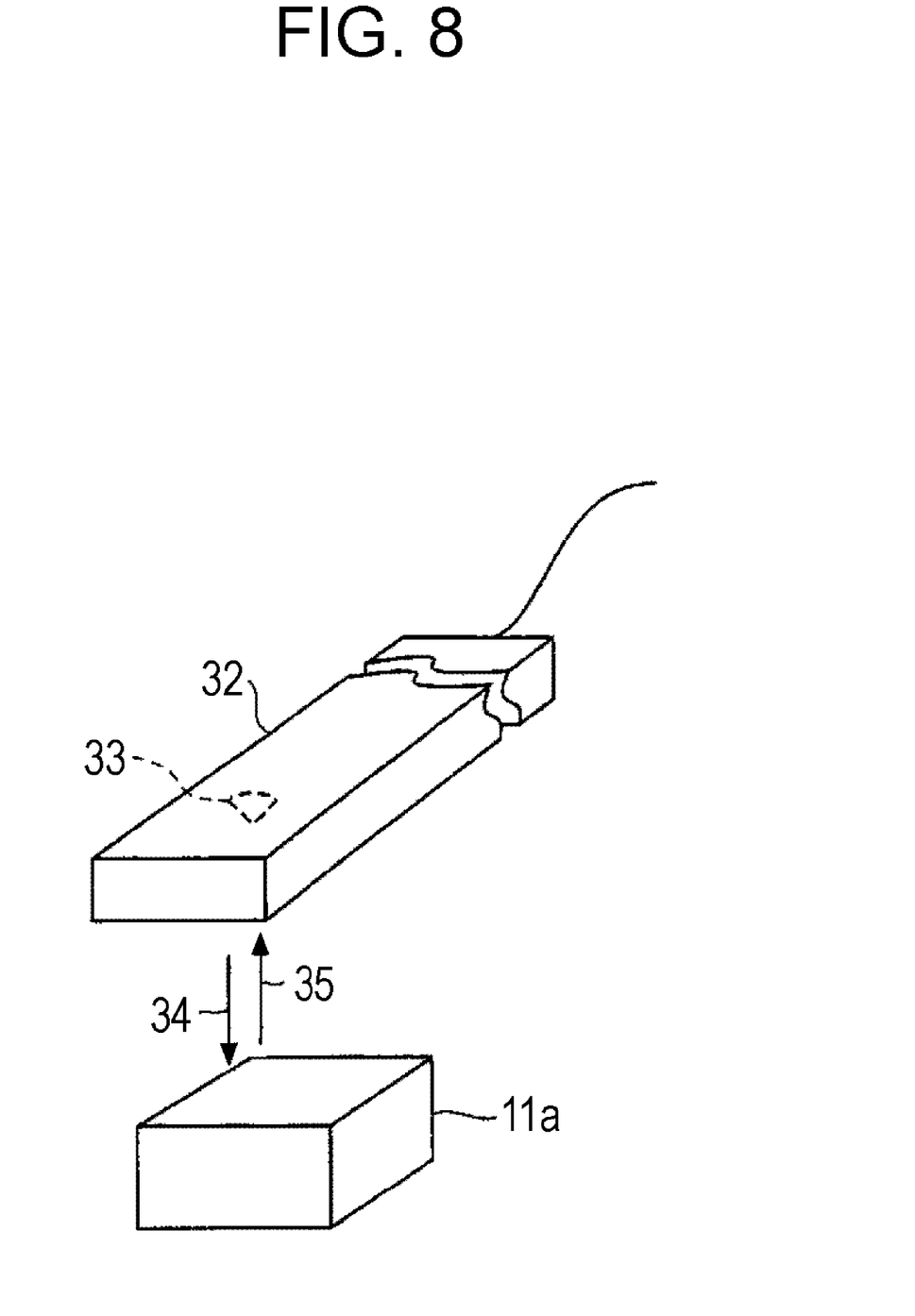
FIG. 8 is a diagram illustrating a relation of transmission and reception of a high-frequency electromagnetic field between a reader and an RF powder particle at a portion where the particle lies.

The reader 32 has a reading probe 33 (see FIG. 8). The reading probe 33 reads frequency information of each RF powder particle 11a using the electromagnetic response to a high-frequency electromagnetic field (RF) of, for example, 2.45 GHz. The RF powder particles 11a, 11b, and 11c each have a resonant frequency of 2.45 GHz, 2.0 GHz, and 1.5 GHz, respectively. Therefore, the reader 32 is configured to generate a magnetic field coupling in the above specific frequency band, for example, in a frequency band of 1.0 to 3.0 GHz. The reader 32 scans the sheet member 30 along the surface in a certain direction while changing the frequency for electromagnetic response within the specific frequency band, since the reader 32 reads the frequency response information based on the magnetic field coupling with the different powder particles 11a, 11b, and 11c in the sheet member 30 via the reading probe 33. In addition, since the sheet member 30 such as paper has a specific color corresponding to the characteristic frequency, it is possible to automatically set a detector to the corresponding characteristic frequency by detecting the color and then conduct reading.

FIG. 8 shows a process of transmission and reflection of energy that occur by magnetic field coupling at a portion where the RF powder particle 11a lies. The reader 32 moves for scanning, and the reading probe 33 lies above the RF powder particle 11a. The reading probe 33 generates a high-frequency magnetic field in the vicinity thereof while varying the frequency in a predetermined range. If the frequency is close or identical to the unique resonant frequency of the RF powder particle 11a, current flows in the tank circuit formed by the coil and the condenser of the RF powder particle 11a by the magnetic field coupling at the same frequency. As a result, transition of energy occurs (shown by the arrow 34 in FIG. 8). The current generates a magnetic field in the vicinity thereof, and part of the transmitted (or "received") energy is consumed as heat in the circuit into an energy loss component. The energy loss component can be measured as a decrease in the reflection component (shown by the arrow 35 in FIG. 8) when it is observed from the reading probe 33 side. When the frequency is identical to the unique frequency, the loss is the maximum, and the reflection component is decreased. The reader 32 reads this decrease and sends the resonated frequency as frequency information of the RF powder particle 11a, together with the positional information of the reading probe 33, to the computer 31. Thus, the existence information (positional and resonated frequency data) of the RF powder particle 11a at the position where the specific RF powder particle 11a lies is recorded in the memory of the computer 31.

The frequency data of a large number of RF powder particles 11a, 11b, and 11c lying in the entire scanning region of a sheet member 30 such as paper shown in FIG. 7 is read by scanning the entire inner and surface of the sheet member 30 with the reader 32, and the data is recorded in the memory of the computer 31. The data recorded in the memory of the computer 31 is processed according to a purpose and is displayed on the display 31a.

The RF powder particles can be used for, for example, detection of forged bank notes or certification of important documents by disposing the RF powder particles 11a, 11b, and 11c in or on, for example, bank notes, important documents such as official documents, licenses, insurance cards, and other important cards by the above-mentioned process or the like. Furthermore, since the RF powder is used as a RF powder-containing liquid 11 containing a large amount or a large number of the RF powder particles 11a, not a single IC tag chip, the handling is easy.

An example of a process for producing the RF powder-containing liquid 11 will be described with reference to FIGS. 9 and 10.

Figure 9:
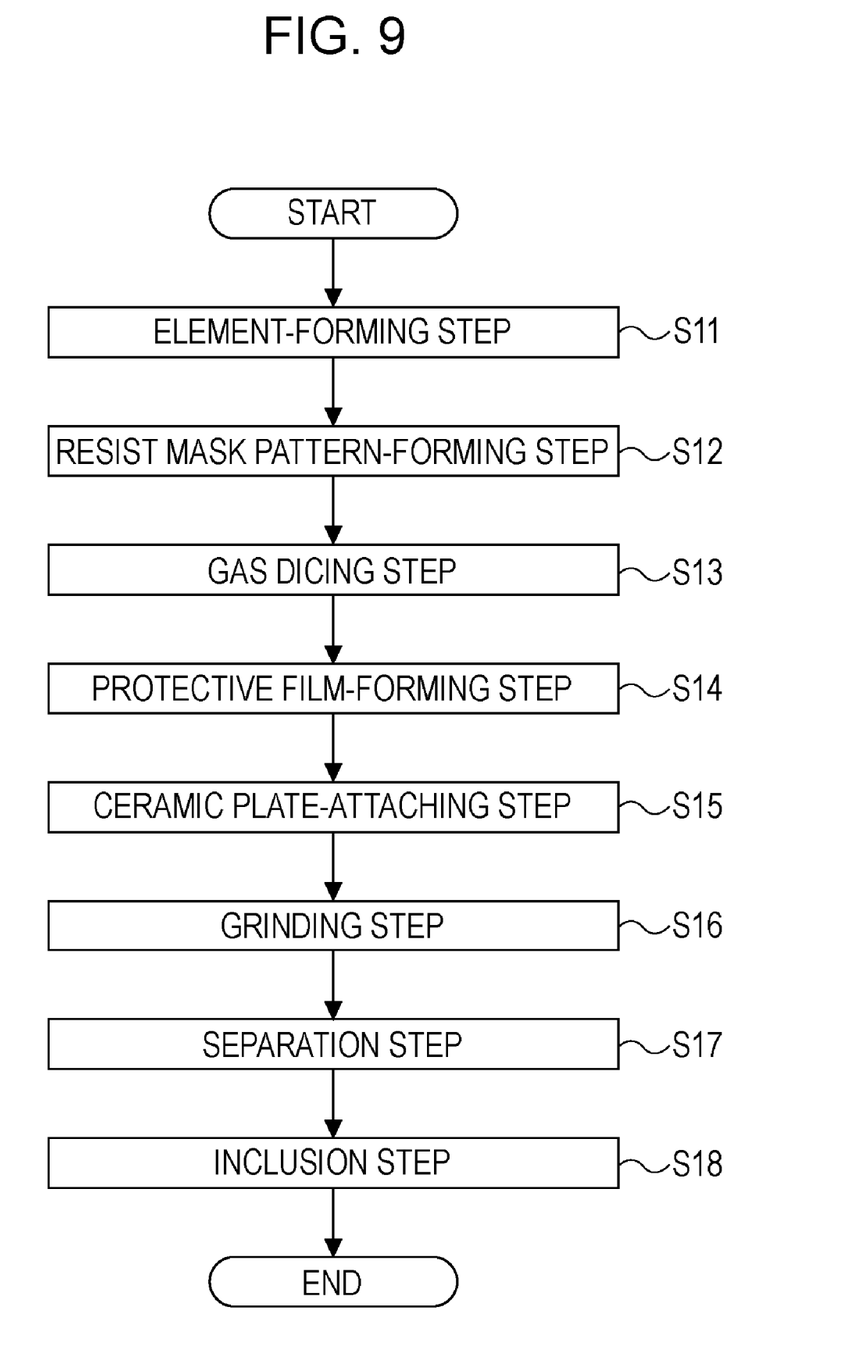
FIG. 9 is a flow chart showing an example of a process of producing the RF powder-containing liquid according to the embodiment.
Figure 10:
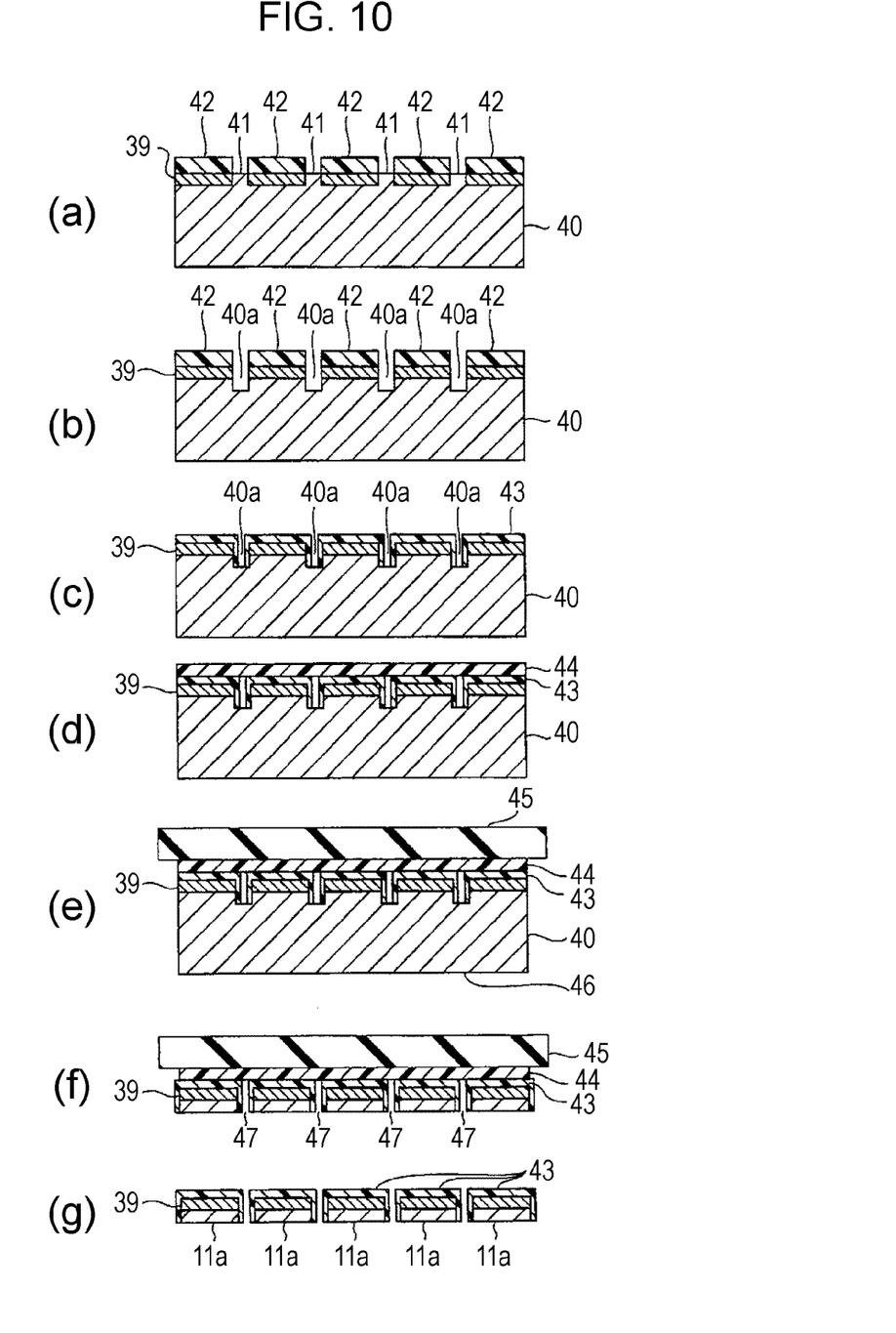
FIG. 10 is cross-sectional configuration views of a wafer and an RF powder particle that correspond to each step of producing the RF powder-containing liquid according to the embodiment.

FIG. 9 shows a whole process for producing the RF powder-containing liquid 11, and FIG. 10 shows longitudinal cross-sectional configurations of a wafer or a powder particle 11a corresponding to each step.

The process for producing the RF powder-containing liquid 11 includes an element-forming step (step S11), a resist pattern-forming step (step S12), a gas dicing step (step S13), a protective film-forming step (step S14), a ceramic plate-attaching step (step S15), a grinding step (step S16), a separation step (step S17), and an inclusion step (step S18).

Each of the above-mentioned steps S11 to S18 will be briefly described. In the element-forming step S11, a large number of antenna circuit elements (39) are formed on a wafer (or substrate). In the resist pattern-forming step S12, a resist pattern for dicing is formed on the wafer surface provided with the circuit elements for magnetic-field coupling. In the gas dicing step S13, cut grooves are formed using gas. In the protective film-forming step S14, a protective film is formed for each antenna circuit element. In the ceramic attaching step S15, the front face side of the wafer is attached to a reinforcement plate, such as a ceramic plate, with an adhesive sheet. In the grinding step S16, the rear face of the wafer is ground until the bottoms of the cut grooves appear. In the separation step S17, the magnetic field-coupling circuit elements, that is, powder particles 11a are separated from the adhesive sheet to prepare a large number of powder particles 11a. In the inclusion step S18, the separated RF powder particles 11a are contained in a liquid medium. Each step will be described in further detail below.

In the element-forming step S11, an insulating film (for example, oxide film) having a thickness of about 10 μm is formed on a surface of a wafer, and tank circuits (magnetic field-coupling circuit elements) each composed of a coil and a condenser are formed on the insulating layer. In FIG. 10, the magnetic field-coupling circuit elements are indicated by reference numeral 39. In the exposure technology used for forming the magnetic field-coupling circuit elements on the insulating film deposited on the wafer surface so as to have a thickness of about 10 μm, collimated light is usually used, and X-rays are preferably used. In the insulating film having a thickness of 10 μm, the surface of the insulating film has asperities. Consequently, in a usual reduced projection exposure technology having a depth of focus, the transfer becomes inaccurate. However, transfer of a mask pattern for forming the magnetic field-coupling circuit elements to a resist can be accurately carried out by an exposure technology using collimated light (X-ray). This allows accurately forming a coil serving as a magnetic field-coupling element. The coil of the magnetic field-coupling element is made of a copper material (copper coating).

After the step of forming the magnetic field-coupling circuit elements that become RF powder particles, a step for plating a metal portion containing the circuit elements on the insulating layer may be conducted. In particular, if the metal portion is made of Cu, the plating is preferably carried out by electroless deposition of CoWP. This plating protects the metal portion of, for example, Cu, and the Cu film is prevented from corrosion. Accordingly, when the RF powder particles are stored in a medium such as a liquid, the RF powder particles themselves are not deteriorated even if their protective films are deteriorated. Thus, the RF powder particles can be properly stored.

The number of the antenna circuit elements 39 formed on the wafer depends on the dicing groove width and is, for example, one million to three millions in a 300 mm wafer.

Subsequently, the resist mask pattern-forming step S12 is carried out (FIG. 10(a)). In FIG. 10(a), magnetic field-coupling circuit elements each composed of a coil and a condenser are formed on the insulating film on the surface of the wafer 40. Resist mask patterns 42 partitioned by dicing lines 41 having a width of smaller than 50 µm, preferably from about 10 to about 30 µm, are formed by lithography on the wafer 40 provided with the large number of magnetic field-coupling circuit elements in the element-forming step S11. In FIG. 10(a), each of the plurality of resist mask patterns 42 corresponds to a set of antenna circuit elements 39.

FIG. 10(b) shows a state of the wafer 40 after the gas dicing step S13. In the gas dicing step S13, the regions of the dicing lines 41 determined by the resist mask patterns 42 on the surface of the wafer 40 are deeply etched within a depth range of 10 to 100 µm by plasma etching. The gas dicing step S13 is conducted for forming grooves 40a having a depth that is about the length of the long side of the magnetic field-coupling circuit element 39 or less, not cutting or separating the wafer 40. These grooves 40a are referred to as "cut grooves". As shown in FIG. 10(b), in the gas dicing step S13, a large number of the cut grooves 40a, which are used in a later step for separating the magnetic field-coupling circuit elements 39 of the wafer 40, are formed in a rectangular net-like pattern.

In the subsequent protective film-forming step S14, a protective film 43, such as a silicon nitride film (SiN), having a desired thickness is formed above the front face of the wafer 40, from which the resist mask patterns 42 are removed, by, for example, plasma CVD (FIG. 10(c)). The protective film 43 is also formed in the inner surface of the cut groove 40a. In FIG. 10, a step for removing the resist patterns 42, which is conducted prior to protective film-forming step S14, is omitted.

The protective film 43 is not limited to a single layer and may be a double layer film. For example, a double layer film composed of a silicon oxide film and a silicon nitride film can be used. A protective film of such a double layer film can reliably protect the circuit elements and prevent corrosion. Accordingly, the RF powder can be stored in a liquid. Furthermore, the protective film 43 is not limited to the silicon nitride film and may be made of, for example, polyimide.

Then, in the ceramic plate-attaching step S15, for example, a two-sided adhesive sheet 44 is bonded to the front face side of the wafer (FIG. 10(d)), and the wafer 40 is attached to a ceramic plate 45 having a desired strength via the two-sided adhesive (FIG. 10(e)).

In the subsequent grinding step S16, the rear face 46 of the wafer 40 is ground. In the grinding step S16, the rear face 46 of the wafer 40 is ground until the bottoms 47 of the cut grooves 40a formed at the front face side are exposed (FIG. 10(f)). The rear face is usually ground by mechanical grinding. The grinding step can be completed only by the mechanical grinding. In this instance, the ceramic plate 45 firmly fixes the wafer 40 with the adhesive sheet 44.

In the separation step S17, the ceramic plate 45 is removed, and the portions, of the wafer 40, provided with the antenna circuit elements 39 are separated as the RF powder particles 11a (FIG. 10(g)). As a result, a large number of the RF powder particles 11a are formed from one wafer 40.

In the separation step, after the separation of the RF powder particles 11a, the resulting RF powder particles 11a may be coated with, for example, CVD. Furthermore, after the grinding step, a low-melting-point material may be deposited on the rear face of the wafer and the cut groove faces; and after the separation step, the low-melting-point material may be heated to a temperature to be melted and then cooled for folding the elements with the low-melting-point material. With these steps, the low-melting-point material which is, for example, polystyrene is melted once and thereby can be rounded.

In the inclusion step S18, the separated RF powder particles 11a are mixed with a liquid, such as alcohol, together with a pigment having a color corresponding to a characteristic frequency and a fixative in a container. Thus, an RF powder-containing liquid 11 is prepared. The liquid may be water instead of alcohol.

The RF powder-containing liquid 11 described with reference to FIGS. 1 to 8 can be thus produced. The RF powder particles 11a each including an antenna circuit element that responds to a predetermined high-frequency electromagnetic field can be provided in a state of an RF powder-containing liquid 11 having a specific color to users. Accordingly, the handling of the RF powder particles 11a can be significantly satisfactory and simple.

The present embodiment is described using three different RF powder-containing liquids having characteristic frequencies of 2.45 GHz, 2.0 GHz, and 1.5 GHz, but the present invention is not limited thereto. Three or more different RF powders can be stored and managed as RF powder-containing liquids having three or more different colors corresponding to those of the RF powders. In addition, in the description of the process of producing the RF powder-containing liquid, a silicon wafer is used as a wafer, but the present invention is not limited thereto. A glass substrate can be used as the wafer, and etching may be carried out using hydrofluoric acid (HF).

The configurations, shapes, sizes, and arrangements described in the above embodiments merely show the present invention schematically such that the invention can be understood and carried out, and the numeric values and compositions (materials) of each component are merely exemplification. Accordingly, the present invention is not limited to the embodiments described above and can be variously modified within the scope of the technical concept described in the claims.

INDUSTRIAL APPLICABILITY

The RF powder-containing liquid of the present invention is used as a form of managing or storing powdery elements as information recording media for authenticating documents or detecting forged bank notes.

REFERENCE NUMERALS

1 container
11 RF powder-containing liquid
11a to 11c RF powder particle
21 RF powder particle
22 substrate
23 insulating layer
24 coil
25 condenser
30 sheet member
32 reader
39 magnetic field-coupling circuit element
40 substrate
40a cut groove
43 protective film
44 adhesive sheet
45 ceramic plate

The invention claimed is:

1. A radio frequency (RF) powder-containing liquid comprising: a liquid; and an RF powder included within the liquid, wherein the RF powder comprises a plurality of RF powder particles, wherein the RF powder particles each include a substrate and an antenna circuit element located on a surface of the substrate; wherein the liquid has a specific color; wherein the specific color of the liquid is indicative of a characteristic frequency of the RF powder; and wherein the liquid includes a pigment and a fixative.

2. The RF powder-containing liquid according to claim 1, wherein the RF powder included within the liquid such that the RF powder is stored and managed within the liquid.

3. The RF powder-containing liquid according to claim 1, wherein the characteristic frequency of the RF powder is about 2.45 GHz and the specific color is substantially blue.

4. The RF powder-containing liquid according to claim 1, wherein the characteristic frequency of the RF powder is about 2.0 GHz and the specific color is substantially yellow.

5. The RF powder-containing liquid according to claim 1, wherein the characteristic frequency of the RF powder is about 1.5 GHz and the specific color is substantially red.

6. The RF powder-containing liquid according to claim 1, wherein the characteristic frequency of the RF powder is from about 1.5 GHz to about 2.45 GHz.

7. The RF powder-containing liquid according to claim 1, wherein a size of a rectangular plane having a maximum long side of the RF powder particle is 0.30 mm square or less.

8. A radio frequency (RF) powder-containing liquid comprising: a liquid; and an RF powder included within the liquid such that the RF powder is stored and managed within the liquid, wherein the RF powder comprises a plurality of RF powder particles, wherein the RF powder particles each include a substrate and an antenna circuit element located on a surface of the substrate; and wherein the liquid includes a pigment and a fixative.

9. The RF powder-containing liquid according to claim 8, wherein the liquid has a specific color indicative of a characteristic frequency of the RF powder.

10. The RF powder-containing liquid according to claim 9, wherein the characteristic frequency of the RF powder is about 2.45 GHz and the specific color is substantially blue.

11. The RF powder-containing liquid according to claim 9, wherein the characteristic frequency of the RF powder is about 2.0 GHz and the specific color is substantially yellow.

12. The RF powder-containing liquid according to claim 9, wherein the characteristic frequency of the RF powder is about 1.5 GHz and the specific color is substantially red.

13. The RF powder-containing liquid according to claim 9, wherein characteristic frequency of the RF powder is from about 1.5 GHz to about 2.45 GHz.

14. The RF powder-containing liquid according to claim 8, wherein the antenna circuit element is a resonant circuit that responds to an electromagnetic field from outside.

15. The RF powder-containing liquid according to claim 8, wherein a size of a rectangular plane having a maximum long side of the RF powder particle is 0.30 mm square or less.

16. A method for providing an RF powder composed of a large number of RF powder particles in a state being stored in a container to a user, wherein the RF powder is included within the liquid; wherein the RF powder particles of the RF powder each include a substrate and an antenna circuit element located on a surface of the substrate; wherein the liquid has a specific color; and wherein the specific color of the liquid is indicative a characteristic frequency of the RF powder; and wherein the liquid includes a pigment and a fixative.

17. A method for providing an RF powder composed of a large number of RF powder particles in a state being stored in a container to a user, wherein the RF powder is included within a liquid such that the RF powder is stored and managed within the liquid; wherein the RF powder particles each include a substrate and an antenna circuit element located on a surface of the substrate; wherein the liquid has a specific color; and wherein the liquid contains a pigment and a fixative.

* * * * *

UNITED STATES PATENT AND TRADEMARK OFFICE
CERTIFICATE OF CORRECTION

| | |
|---|---|
| PATENT NO. | : 8,318,047 B2 |
| APPLICATION NO. | : 12/516705 |
| DATED | : November 27, 2012 |
| INVENTOR(S) | : Yuji Furumura et al. |

It is certified that error appears in the above-identified patent and that said Letters Patent is hereby corrected as shown below:

On the title page, in Column 1, item (75), under "Inventors", on Line 2, delete "Tokyo (JP);" and insert -- Chiyoda, Tokyo (JP); --, therefor.

Signed and Sealed this
Thirtieth Day of September, 2014

Michelle K. Lee
*Deputy Director of the United States Patent and Trademark Office*